United States Patent [19]

Eckebrecht

[11] Patent Number: 4,574,519
[45] Date of Patent: Mar. 11, 1986

[54] MOUSE TRAP

[76] Inventor: James L. Eckebrecht, 1384 Tyandaga Park Dr., Burlington, Ontario, Canada

[21] Appl. No.: 536,765

[22] Filed: Sep. 28, 1983

[51] Int. Cl.$^4$ .............................................. A01M 23/28
[52] U.S. Cl. .......................................... 43/81; 43/82; 43/81.5
[58] Field of Search ....................... 43/81, 81.5, 82, 58, 43/77, 92

[56] References Cited

U.S. PATENT DOCUMENTS

| 869,594 | 10/1907 | Stone | 43/82 |
| 1,014,550 | 1/1912 | Winkler | 43/81 |
| 1,226,517 | 5/1917 | Hoffman | 43/81 |
| 1,342,255 | 6/1920 | Doust | 43/82 |
| 1,458,404 | 6/1923 | Goodman | 43/82 |
| 1,992,294 | 2/1935 | Eycleshymer | 43/82 |
| 2,052,106 | 8/1936 | Myklebust | 43/92 |
| 2,144,956 | 1/1939 | Arndt | 43/81 |
| 2,343,589 | 3/1944 | Stilson | 43/81.5 |
| 4,403,438 | 9/1983 | West-Harron | 43/82 |

FOREIGN PATENT DOCUMENTS

| 1107444 | 5/1961 | Fed. Rep. of Germany | 43/82 |
| 181739 | 1/1936 | Switzerland | 43/82 |
| 383051 | 11/1932 | United Kingdom | 43/82 |
| 657259 | 9/1951 | United Kingdom | 43/81 |

Primary Examiner—Nicholas P. Godici
Assistant Examiner—K. Rowan
Attorney, Agent, or Firm—David J. French

[57] ABSTRACT

A novel mouse trap is provided herein. The trap includes a base, a sensing platform having a forward end and a rearward extension and pivotable as a first class lever about an intermediate fulcrum. A spring loaded garrot wire is movable between a spring-load position extending rearwardly of the base and a spring-released, tripped position extending forwardly of the base, holding means for holding the garrot wire in its spring-loaded position and trip bar means for releasing the holding means to allow the garrot wire to move to the spring-released, tripped position. The essence of the invention resides in the provision of a combined holding member and trip bar, of a particular specified shape and having one essential element extending rearwardly from the sensing platform and lying beneath the garrot wire when the garrot wire is in the spring-loaded position. The linkage is pivotal about a fulcrum, and is held to the garrot wire by the holding member. The site of the holding of the garrot wire by the holding member must be outboard of that fulcrum.

3 Claims, 3 Drawing Figures

MOUSE TRAP

BACKGROUND OF THE INVENTION (i) Field of the Invention

This invention relates to a mousetrap.

(ii) Description of the Prior Art

Mousetraps including a spring retained bar to catch mice, which bar is tripped by the animal attacking the bait, are well known now. For example, Canadian Pat. No. 167,771 dated Oct. 15, 1894 in the name of William C. Hooker provides a mousetrap including a base, and a spring-actuated jaw constructed of a single piece of wire coiled to form a transverse spring and extended from one end of the latter and shaped into a loop terminating at the opposite side of the coil and continued to form a transverse portion arranged within the coil. A locking bar is provided, as well as a trigger for setting the jaw.

More recently, Canadian Pat. No. 500,600 issued Mar. 16, 1954 in the name of K. H. Hill purported to provide an animal trap comprising a base member having an abutment at one end, with a substantially rectangular and open frame member slidably mounted on the base member and having a portion adapted to cooperate with the abutment to garrot an animal disposed between the abutment and the portion. Means normally urge the portion toward the abutment. A pivotal lever was mounted on the base member and has first and second terminal hooks to engage one end of the frame and to engage a swingable trigger carried by the base member when the frame member is in cocked position. A contact frame was carried by the trigger and was disposed above the frame member for actuating the trigger and plates; a pivot pin and a pair of guide arms projecting laterally from the plates and slidably receiving the end of the lever adjacent the first terminal hook therebetween, are provided to trip the trap.

Canadian Pat. No. 558,181 issued June 3, 1958 in the name of J. V. Lehm purported to provide an improvement in bait-retaining means for a trap primarily designed for catching mice, rats and other rodents and small aminals. His improved animal trap included a base, a spring-actuated animal engaging means, latching means for the engaging means, and a particularly constructed bait pedal pivotally connected to the base.

Canadian Pat. No. 672,144 patented Oct. 15, 1963 in the name of William J. Barr provided an improvement in a rodent trap which consisted of a base which may be set either in a vertical or a horizontal position. A spring-loaded wire jaw, hingedly mounted on the base, was adapted to be held in the "set" position by means of a latch arm which had a hook on its free end for engaging a loop of a hingedly mounted trigger. The loop of this trigger projected outwardly of the base and the mounting of the trigger was such that small movement of the trigger was said to release the latch arm. The trigger was bent away from the base so that a rodent may move beneath it to release the trap.

Canadian Pat. No. 677,680 patented Jan. 7, 1964 in the name of S. C. Wernham et al provided improved animal traps, e.g., those including a trigger structure which had a built-in scent or odor providing a lure for attracting rodents. The patentee provided a novel trigger structure for use in a rodent trap in the form of a resilient jaw means of plastic material, the jaw means having flavor material distributed in the plastic material thereof and imparting to the trigger structure an odor which is attractive to rodents.

SUMMARY OF THE INVENTION (i) Aims of the Invention

A problem with all such rodent traps is that the rodent must actually strike the bait in order to trip the trap. It would therefore be desirable to provide a rodent trap which is tripped by a rodent approaching the bait, without actually striking the bait.

An object of the present invention is to provide a combination bait holder and trigger structure which is constructed so that there is reduced chance for an animal to approach or attack the bait without actuating the trap.

Another object of this invention is the provision of a trap which, when bait is used, does not come into proximate contact with the trigger release portion of the mechanism.

Yet a further object of this invention is the provision of a trap which is set off by the body of the rodent and, therefore, the rodent is in such a position relative to the trap elements that there is little likelihood of escape.

Still another object of this invention is the provision of a trap which has a means of setting so that there is reduced likelihood of it going off accidentally when it is being set or at any other time.

Another important object of the present invention is to provide an animal trap so designed as to be used without the necessity of applied bait.

A still further object of the present invention is to provide an animal trap that is simple and practical in construction, strong and reliable in use, relatively inexpensive to manufacture, and otherwise well adapted for the purpose for which it is intended.

Another object of this invention is the provision of a sensitive trap which may be readily set, and which will be instantly sprung at the minimum attempt of an animal to obtain the bait.

(ii) Statement of Invention

This invention provides in its broadest concept an improvement in a mousetrap including a base, a sensing platform, having a forward end and a rearward extension, the platform being pivotable as a first class lever about a controlled intermediate fulcrum, a spring loaded garrot wire movable between a spring-loaded position extending rearwardly of the base and a spring-released tripped position extending forwardly of the base, holding means for holding the garrot wire in its spring-loaded position and trip bar means for releasing the holding means to allow the garrot wire to move to the spring-released, tripped position, the improvement comprising: holding means and the trip bar means collectively comprising a linkage including a longitudinally extending portion pivotally secured to the rearward extension of the sensing platform and an angular portion upstanding from the longitudinally extending portion and terminating in the holding means, the linkage being retained by, and pivotal about, a fixed fulcrum element disposed at the juncture of the longitudinally extending portion and the angular portion, whereby the longitudinally extending portion and the angular portion of the linkage is adapted to lie beneath the garrot wire when the garrot wire is in its spring-loaded position, and whereby the holding means of the linkage to the garrot wire is disposed outboard of the fixed fulcrum element.

(iii) Other Features of the Invention

By one feature of the broadest concept of this invention, the linkage comprises an inverted first class lever disposed at the rear of the base, the rearward end of the lever being adapted to engage and retain the garrot wire the forward end of the lever being adapted to be rotated in a clockwise direction by the end of the rearward extension of the sensing platform, thereby to rotate the holding means in a clockwise direction, thereby to release the garrot wire.

By another feature of the invention, mousetrap comprises (a) a base; (b) a first transversely extending fulcrum means associated with the base; (c) a sensing platform pivotally mounted with respect to a first, transversely-extending fulcrum means about a pivot axis which is coincident with the first, transversely, extending fulcrum means, the sensing platform being a first class lever, and being provided with a rearward extension angularly upwardly oriented with respect to a forward portion of the sensing platform; (d) second longitudinally oriented fulcrum means upstanding from the base proximate to the rear end of the base; (e) a spring loaded garrot wire rotatably mounted between a pair of oppositely facing pivot points and adapted to be oscillatably movable between a spring-released tripped position, extending forwardly of the base and a spring-loaded position extending rearwardly of the base; and (f) a spring catch holding means acting as an inverted first class lever, the said spring catch holding means comprising a linkage including a longitudinally extending portion pivotally secured to the rearward extension of the sensing platform and an angular portion upstanding from the longitudinally extending portion and terminating in a holding means, the linkage being retained by, and pivotal about, a fixed fulcrum element disposed at the juncture of the longitudinally extending portion and the angular portion, whereby the longitudinally extending portion of the linkage is adapted to be beneath the garrot wire when the garrot wire is in its spring-loaded position, and whereby the holding means of the linkage to the garrot wire is disposed outboard of the fulcrum, whereby downward movement of the sensing platform as a rodent approaches the bait causes the forward end of the lever to be rotated in a clockwise direction by the end of the rearward extension of the sensing platform, thereby to rotate the holding means in a clockwise direction, thereby to release the garrot wire and to trip the trap.

By yet another feature of this invention, the first fulcrum means comprises a "V"-shaped transversely extending notch in the base.

By another feature of the invention, the base is formed from sheet metal and the oppositely facing pivot points comprises a pair of lateral pedestals upstanding from the base adjacent the mid-point of the base, the pedestals each being in the form of flanges punched out from the metal base, the pedestals being each provided with aligned apertures therethrough.

By yet another feature of the invention, the sensing platform is provided with a transversely-extending V-shaped notch adapted to mate with the similar V-shaped notch in the base.

By a further feature of the invention, the sensing platform is in the form of a straight bait area and a reduced area trip bar.

By yet another feature of the invention, the base is formed from sheet metal, and the second fulcrum means comprises an upstanding post disposed along the central longitudinal axis of the base, the post including a transversely-extending fulcrum slot therein.

By yet another feature of this invention, the upstanding post is punched out from the metal base.

By a still further feature of the invention, the spring catch holding means comprises a longitudinally extending portion in the form of two spaced apart segments of a wire, the free ends thereof being pivotally joined to respective spaced apart ears on the rearward extension of the sensing platform, and an angular portion in the form of spaced apart extensions of the segments of the wire, the spaced apart extensions meeting at an arcuate forwardly angularly projecting nose portion.

By a still further feature of the invention, the nose portion is provided with friction-retaining means to hold the garrot wire, the friction-retaining means comprising a downwardly depending bead.

By yet another feature of the invention, the lower trip arm of the spring catch is pivotally mounted with respect to the second fulcrum means.

By still another feature of the invention, the garrot wire is provided with an integral, forward gripping finger which is adapted to be engaged by the nose portion of the spring catch holding means.

By a still further feature of the invention, the base is of sheet metal provided with a groove extending around the perimeter thereof.

BRIEF DESCRIPTION OF THE DRAWINGS

In the accompanying drawings.

DESCRIPTION OF PREFERRED EMBODIMENTS

Figure 1:
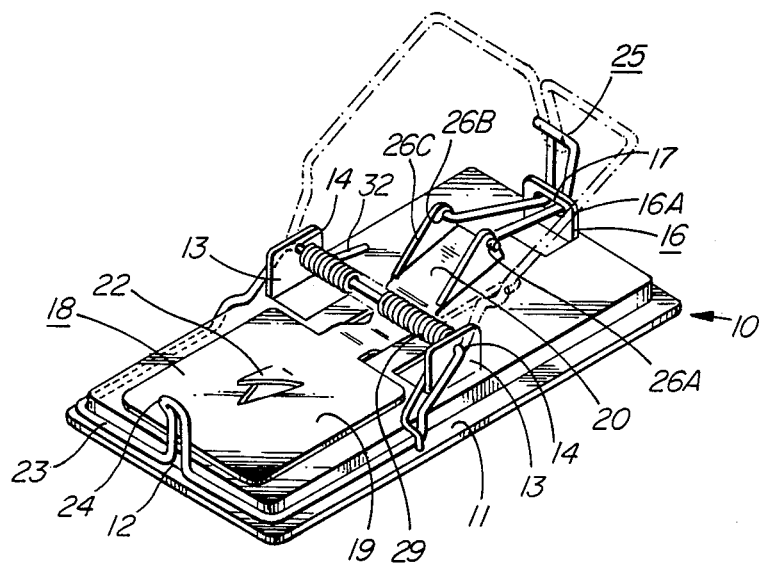
FIG. 1 is a perspective view of one embodiment of the trap in its sprung condition.
Figure 2:
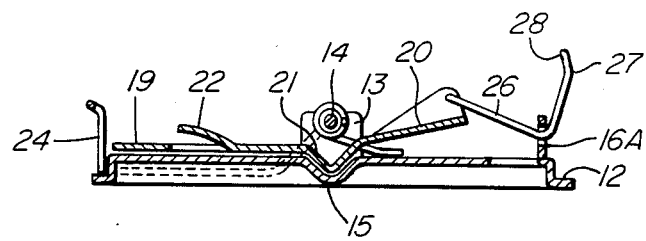
FIG. 2 is a perspective view of the embodiment of the trap in its set condition.
Figure 3:
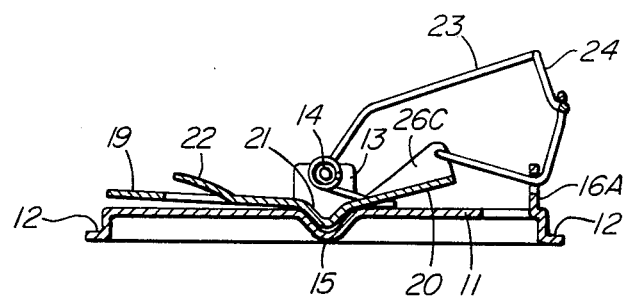
FIG. 3 is a side elevational view of another embodiment of the trap in its set condition.

The trap 10 comprises a base 11 of generally rectangular shape. Preferably the base 11 is formed by strip rolled steel which is stamped out in the desired shape. Preferably, also, the periphery of the base 11 is provided with a groove or corrugation 12 which serves the dual purpose of providing strength and rigidity to the base 11 and of providing a recess 12 for the accommodation of a garrot wire, to be described hereinafter. The base 11 is provided with a pair of lateral, facing, punched-out flange pedestals 13, the pedestals being provided with aligned apertures 14 for the passing therethrough of the transverse axle of a garrot wire, to be described later. At the region of the pedestals 13, the base 11 is provided with a transverse "V"-shaped depression 15 whose purpose as a controlled intermediate fulcrum will be discussed hereinafter.

The base 11 is also provided with a fixed fulcrum element 16 in the form of a post diposed along the central longitudinal axis of the base, i.e., a spring catch pedestal 16a punched out of the base 11 near the rear thereof. Alternatively, (although not shown) such spring catch pedestal may be provided by a pair of mutually opposed flanges disposed on either side of the central longitudinal axis of the base punched out from the metal base, i.e., a pair of facing punched out pedestals striding the central longitudinal axis of the base 11, and provided with aligned apertures to hold a spring catch (to be discussed later). The spring catch pedestal 16a is provided with a transverse slot 17 to hold a spring catch wire 24 to be described in greater detail hereinafter.

A bait platform 18 is in the form of a generally rectangular main bait portion 19 and a trapezoidally-shaped rearward extension 20. The sensing platform 18 may be in the form of a raised bait area and a reduced area lower rearward extension 20 and it may have an area similar to but slightly smaller than the area of the base forward of the controlled intermediate fulcrum 15, and it may include a bait area of generally rectangular shape and integral trip bar of trapezoidal shape. The bait platform 80 is provided with a transverse "V"-shaped depression 21 to cooperate with a V-shaped controlled intermediate fulcrum in the form of a depression 15 in a manner to be described later. A bait holder, in the shape of a projection 22 is punched out of, and projects upwardly from, the bait area 19.

A garrot wire 23 of generally rectangular shape is provided, of a size and shape to fit into the corrugation 12 of the base 11. A lifting finger 24 projects from the front portion of the garrot wire 23 to enable the garrot wire 23 to be raised to release a trapped rodent without having to touch the rodent.

Finally, spring catch 25 is provided. The spring catch may be a generally "U"-shaped wire, or it may be a generally "L"-shaped wire. The "U"-shaped spring catch wire 25 includes a lower forwardly extending arm 26 adapted to be disposed above, but to engage the rearward extension 20 of the bait platform 18 and an upper upwardly and forwardly extending arm 27. Thus, the spring catch 25 has a lower trip arm of the spring catch wire pivotally mounted with respect to the first fulcrum element 16. The spring catch wire 25 may be provided with friction retaining means to hold the garrot wire 23, e.g. a lower bead 28 to engage the garrot wire 23. The arm 26 is attached by pin ends 26a, in appertures 26b in pedestals 26c on rearward extension 20.

To assemble the trap, the bait platform 18 is placed between the pedestals 13 with its "V"-shaped depression 21 fitted matingly in the "V"-shaped depression 15 in the base 11. A coil spring 29 is concentrically disposed around the rear transverse axle portion 30 of the garrot 23, and the axle portion of the garrot wire 23 is then threaded through apertures 14. The coil spring 29 thus holds the bait platform 18 pivotally within the base 11. The coil spring 29 has one arm 31 engaged over the top of one side arm of the garrot 23, and has its reaction arm 32 resting against the base 11. The trip lever 25 is placed loosely through the transverse slit 17, with arm 26 extending forwardly, and attached as shown.

OPERATION OF THE PREFERRED EMBODIMENT (i) Setting the Trap

To set the trap, the bait is first secured to the bait holder 22. Then the garrot wire 23 is rotated from its forward position to a spring set or cocked position with its forward transverse arm 32 now placed at a rear position, and resting below bead 28 of arm 27. It is thus seen that the longitudinal extending portion 26 of the spring catch wire or linkage 25 now lies below the garrot wire 23 and the holding means of the linkage 25 to the garrot wire 23, i.e. arm 27 and head 28, is disposed outboard of the fixed fulcrum element 16.

(ii) Tripping the Trap

The tripping action is as follows:

As a rodent transverses the bait platform 18 approaching the bait at the bait holder 22, its weight causes the bait platform 18 to rotate clockwise, with the bait area moving downwardly. This causes the rear tip of the rearward extension 20 to move upwardly, thus causing the end of arm 26 to be raised. This causes the spring catch 25 to be rotated counterclockwise, simultaneously moving bead 28 out of contact with the forward arm 33 of garrot wire 23. This allows spring 29 to cause the garrot wire to be rapidly rotated to the tripped position, thereby killing the rodent.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A mousetrap comprising:
   (a) a base;
   (b) first transversely extending fulcrum means associated with said base;
   (c) a sensing platform pivotally mounted with respect to said first, transversely-extending fulcrum means about a pivot axis which is coincident with said first, transversely, extending fulcrum means, said sensing platform being a first class lever, and being provided with a rearward extension;
   (d) second longitudinally oriented fulcrum means upstanding from said base proximate to the rear end of the base;
   (e) a spring loaded garrot wire rotatably mounted between a pair of oppositely facing pivot points and adapted to be oscillatably movable between a spring-released, tripped position, extending rearwardly of the base; and
   (f) a spring catch holding means acting as an inverted first class lever, said spring catch holding means comprising a linkage including a longitudinally extending portion pivotally secured to said rearward extension of said sensing platform said longitudinally extending portion being in the form of two spaced apart segments of a wire, the free ends thereof being pivotally joined to respective spaced apart ears on said readward extension of said sensing platform, and an angular portion upstanding from said longitudinally extending portion and terminating in a holding means, said angular portion being the form of spaced apart extensions of said segments of said wire, said spaced apart extensions meeting at an arcuate forwardly angularly projecting nose portion, said linkage being retained by, and pivotal about, a fixed fulcrum element disposed at the juncture of said longitudinally extending portion and said angular portion, whereby said longitudinally extending portion of said linkage is adapted to lie beneath the garrot wire when the garrot wire is in its spring-loaded position, and whereby said holding means of said linkage to said garrot wire is disposed outboard of said fulcrum whereby downward movement of said sensing platform as a rodent approaches said bait causes said forward end of said lever to be rotated in a clockwise direction by the end of said rearward extension of said sensing platform, thereby to rotate the holding means in a clockwise direction, thereby to release said garrot wire and to trip the trap.

2. The mousetrap of claim 1 wherein said holding means is provided with friction-retaining means to hold said garrot wire, said friction-retaining means comprising a downwardly depending head.

3. The mousetrap of claim 1 wherein said garrot wire is provided with an integral, forward gripping finger, which is adapted to be engaged by said nose portion of said spring catch holding means.

* * * * *